United States Patent
Wei et al.

(10) Patent No.: US 9,746,635 B2
(45) Date of Patent: Aug. 29, 2017

(54) LENS MODULE

(71) Applicants: Chuandong Wei, Shenzhen (CN); Jie Ma, Shenzhen (CN); Yuchan Gao, Shenzhen (CN)

(72) Inventors: Chuandong Wei, Shenzhen (CN); Jie Ma, Shenzhen (CN); Yuchan Gao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/082,880

(22) Filed: Mar. 28, 2016

(65) Prior Publication Data

US 2017/0139177 A1  May 18, 2017

(30) Foreign Application Priority Data

Nov. 17, 2015 (CN) .................... 2015 2 0916108 U

(51) Int. Cl.
*G02B 7/02* (2006.01)
*G02B 9/04* (2006.01)
*H04N 5/225* (2006.01)
*G02B 7/00* (2006.01)
*G02B 13/00* (2006.01)

(52) U.S. Cl.
CPC ............ *G02B 7/026* (2013.01); *G02B 7/003* (2013.01); *G02B 7/021* (2013.01); *G02B 7/025* (2013.01); *G02B 9/04* (2013.01); *G02B 13/001* (2013.01); *H04N 5/2254* (2013.01); *G02B 13/003* (2013.01)

(58) Field of Classification Search
CPC .......... G02B 7/02; G02B 7/021; G02B 7/022; G02B 7/025; G02B 7/026; G02B 9/04; G02B 13/001; G02B 13/003; G02B 13/18; G03B 17/00; H04N 5/74; H04N 5/2252; H04N 5/2254
USPC ....... 359/740, 793, 811, 813, 819, 823, 824, 359/826, 830; 396/89, 91, 98, 439; 348/25, 31, 357, 360, 362, 373, 374
See application file for complete search history.

(56) References Cited

U.S. PATENT DOCUMENTS

| | | | | |
|---|---|---|---|---|
| 8,411,192 B2* | 4/2013 | Fukamachi | ............ | G02B 7/021 348/335 |
| 8,436,937 B2* | 5/2013 | Chang | ................... | H04N 5/2251 348/224.1 |
| 8,599,501 B2* | 12/2013 | Chang | ...................... | G02B 7/02 359/811 |
| 8,982,486 B2* | 3/2015 | Mori | ................... | B29C 45/1671 359/819 |
| 9,134,499 B2* | 9/2015 | Mori | ................. | B29C 45/14065 |
| 9,193,117 B2* | 11/2015 | Fujii | .................... | B29C 45/1671 |
| 9,223,115 B2* | 12/2015 | Fujii | .................... | G02B 13/001 |
| 9,594,229 B2* | 3/2017 | Fujinaka | ................ | G02B 7/102 |

* cited by examiner

*Primary Examiner* — Loha Ben
(74) *Attorney, Agent, or Firm* — Na Xu; IPro, PLLC

(57) ABSTRACT

A lens module is disclosed. The lens module includes a lens barrel including a first barrel wall extended horizontally and a second barrel wall extended from the first barrel wall; a lens group including at least one lens, the lens includes a first slope; a stop on the first barrel wall and forming a light hole for the lens, and a pressing ring attached to the stop. The first barrel wall of the lens barrel includes a second slope abutting against the first slope for ensuring the concentricity.

10 Claims, 2 Drawing Sheets

LENS MODULE

FIELD OF THE DISCLOSURE

The present utility relates to a lens module, particularly to the lens module of mobile phones, digital cameras, PDAs, note books and other electronic products.

BACKGROUND

As the photographic technology and the electronic products with photographic function are developed in recent years, optical camera lens module is used widely in many kinds of products. In order to follow the current trend that the size of electronic products is smaller, the lens module shall also be smaller.

In the existing technology, the lens module comprises a lens barrel having a central axis, lenses installed in the lens barrel and a stop clamped between the lenses. The lens barrel comprises a first barrel wall extended horizontally, i.e., at right angles to the central axis and a second barrel wall extended from the first barrel wall along the central axis direction. A light hole is created on the first barrel wall for the lens. However, the light hole on the first barrel wall requires the barrel wall with a certain thickness, therefore, the wall thickness of the barrel wall is increased, and the height and weight of the entire lens module is increased. It will be more difficult to produce the lens barrel. In the existing technology, a slope is also provided on the first barrel wall at the position of the light hole, so, the difficulty of production is increased further.

For this reason, it is necessary to provide a novel lens module to overcome the shortcomings above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and an exemplary embodiment thereof.

Figure 1:
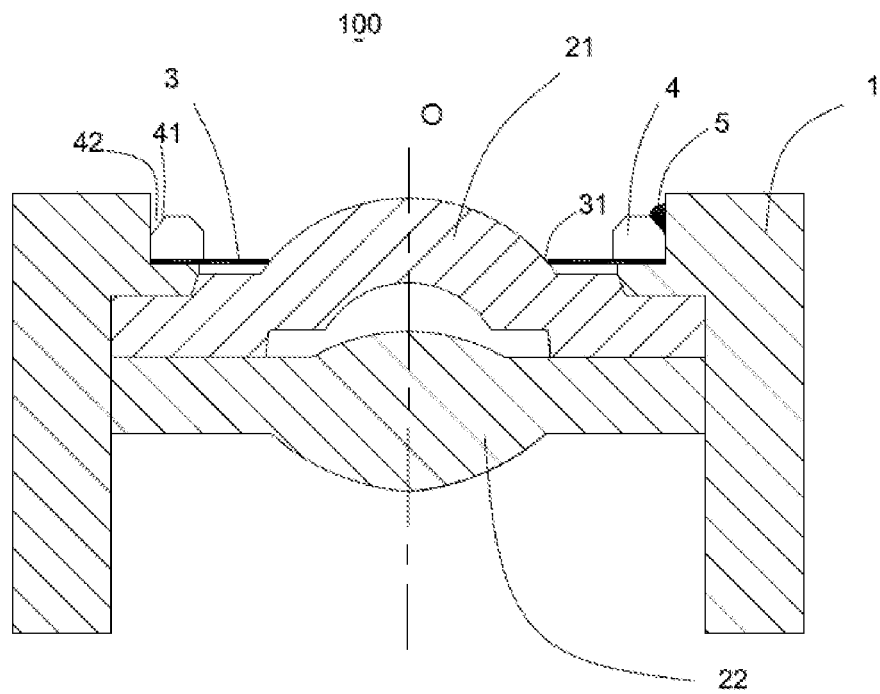
FIG. 1 is an illustration of a lens module in accordance with an exemplary embodiment of the present disclosure.

As shown in FIG. 1, a lens module 100 in accordance with an exemplary embodiment of the present disclosure comprises a lens barrel 1 having a central axis O, a lens group 2 (see FIG. 3) installed in the lens barrel 1, a stop 3 installed on the lens barrel 1, and a pressing ring 4 attached to the stop 3.

Figure 2:
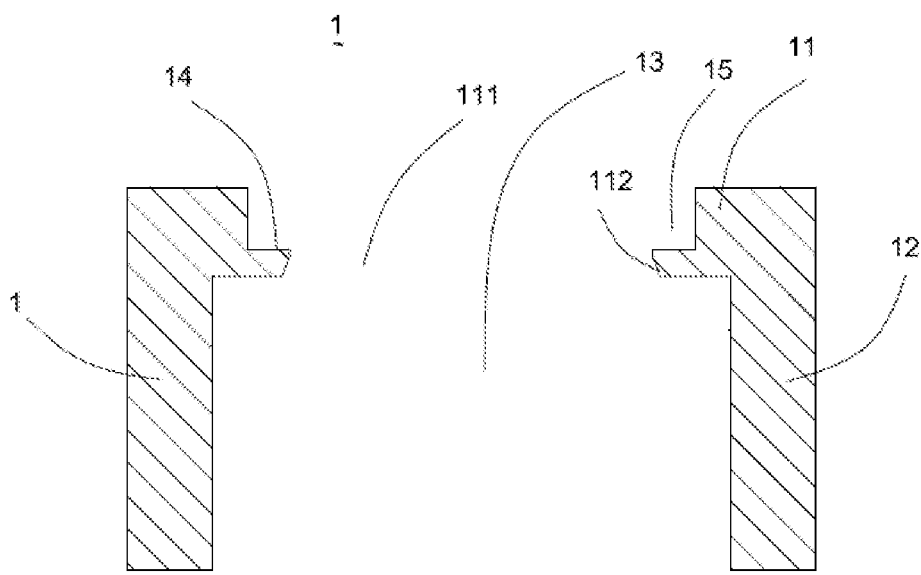
FIG. 2 is an illustration of a lens barrel of the lens module in FIG. 1.

As shown in FIG. 2, the lens barrel 1 comprises a first barrel wall 11 extended horizontally and a second barrel wall 12 extended downward from the first barrel wall 11. A receiving space 13 is formed by the first barrel wall 11 and the second barrel wall 12. The lens barrel 1 is provided with a lug 14 extended from the inner surface of the first barrel wall 11 to the central axis of the lens barrel 1. A groove 15 is created by the lug 14 and the inner surface of the lens barrel 1. The groove 15 communicates with the receiving space 13. The stop 3 is located partially in the groove 15. The lug 14 on the first barrel wall 11 creates a hole 111 which is connected to the receiving space 13. The lug 14 is provided with a second slope 112.

Figure 3:
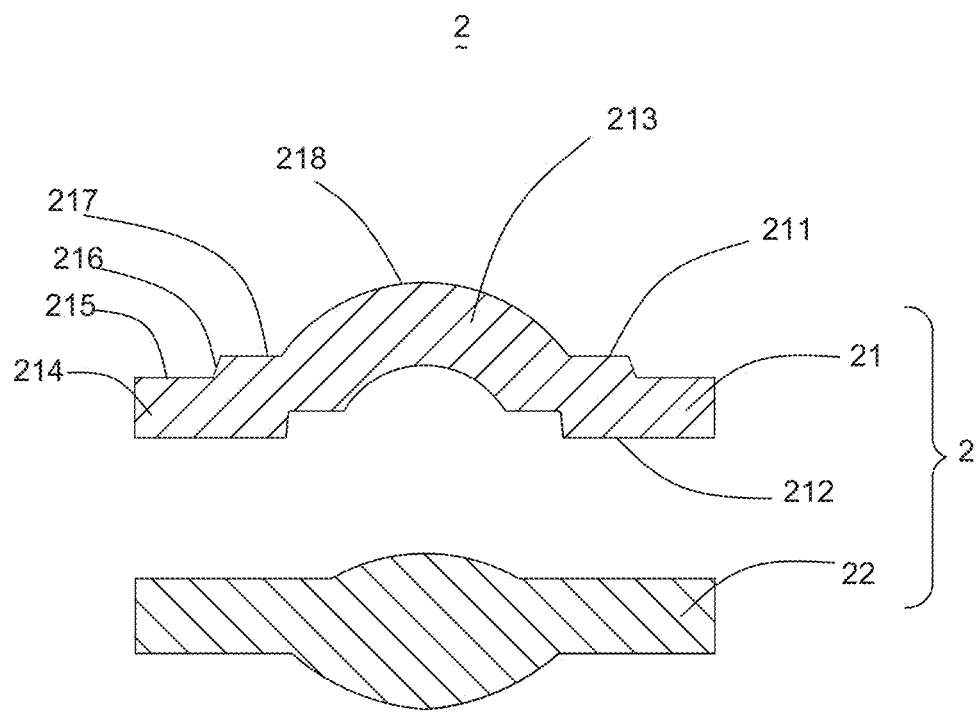
FIG. 3 is an illustration of the lens group in the lens module in FIG. 1.

As shown in FIG. 3, the lens group 2 comprises a first lens 21 and a second lens 22 which is stacked on the first lens 21. The lens group 2 in this embodiment comprises two lenses. In other embodiments, the lens group can comprise one lens or more than two lenses. The first lens 21 comprises a first surface 211 far from the second lens 22 and a second surface 212 opposite to the first surface. The first lens 21 comprises a protruding central portion 213 and a peripheral portion 214 around the protruding central portion 213. The first surface 211 of the first lens 21 comprises, in turn from external to internal, a first flat surface 215 extended horizontally, a first slope 216 against the second slope 112, a second flat surface 217 extended horizontally, and a first optical surface 218. The first flat surface 215, the first slope 216 and the second flat surface 217 are located at the peripheral portion 214 of the first lens 21. The first optical surface 218 is a circular arc surface and is located on the protruding central portion 213 of the first lens 21. The inclination of the first slope 216 and the inclination of the second slope 112 are the same so that the first slope 216 and the second slope 112 fit in fully with each other. A gap is created between the second flat surface 217 and the stop 3. In other embodiments, the second flat surface 217 and the stop 3 can fit in fully with each other. The peripheral portion 214 of the first lens 21 is clamped between the first barrel wall 11 and the second lens 22. The optical axis of the first lens 21, the optical axis of the second lens 22 and the central axis of the lens barrel 1 are aligned in one straight line.

The stop 3 is located partially in the groove 15 on the first barrel wall 11 of the lens barrel 1 and extended horizontally and inwardly beyond the lug 14. The stop 3 compromises a light hole 31 for the protruding central portion 213 of the first lens 21. The stop 3 is a hollow ring. The aperture of the light hole 31 is smaller than the aperture of the hole 111. The central axis of the stop 3, the optical axis of the lens group 2 and the central axis of the lens barrel 1 are aligned in one straight line. The stop 3 contacts the first optical surface 218 of the first lens 21.

The press ring 4 is installed in the groove 15 of the lens barrel 1 and is pressed on the stop 3, thereby the stop 3 is fixed more stably. A third slope 41 is provided at the edge of the press ring 4. The third slope 41 and the inner surface of the lens barrel 1 create the glue groove 42. The press ring 4 is fixed by glue 5 on the lens barrel 1, and then the stop 3 is clamped between the press ring 4 and the lens barrel 1. The press ring 4 can also be installed with an interval to the lens barrel 1 in horizontal direction, so that a gap is created between the press ring and the lens barrel. A glue groove for receiving the glue is created by the outer wall of the press ring and the inner surface of the lens barrel and the stop. The stop can be fixed directly by glue on the lens barrel. The press ring 4 is made of plastic or metal.

When assembling the lens module 100, the lens barrel 1 and the stop 3 are installed first. The stop 3 is installed in the groove 15 of the lens barrel 1. The press ring 4 is pressed on the stop 3 and fixed by glue 5 in the glue groove 41 created by the inner surface of the first barrel wall 11. The central axis of the stop 3 and the central axis of the lens barrel 1 are aligned in one straight line. The first lens 21 is installed in the lens barrel 1. The first flat surface 215 of the first lens 21 is abutted against the first barrel wall 11 of the lens barrel 1. The first slope 216 of the first lens 21 is abutted against the second slope 112 of the first barrel wall 11. The fit between the slopes ensures the concentricity between the first lens 21 and the lens barrel 1. The first lens 21 can be pressed precisely into the lens barrel 1. The first optical surface 218 of the first lens 21 is extended beyond the light hole 31 of the stop 3. The edge of the first lens 21 has press fit with the inner surface of the second barrel wall 12 of the lens barrel 1. The second lens 22 is installed under the first lens 21. The edge of the second lens 22 has press fit with the inner surface of the second barrel wall 12 of the lens barrel 1. Certainly, the first lens 21 and the second lens 22 can be also put directly into the lens barrel 1 and no press fit on the inner surface of the lens barrel 1. At last, the second lens 22 is fixed further by glue in the lens barrel 1. At this point, the assembling of the lens module 100 is finished.

The stop 3 can block off stray light, moreover, the stop 3 can create directly the light hole 31 for the protruding central portion 213 of the first lens 21. The wall thickness of the first barrel wall 11 can be very thin, thereby the height and weight of entire lens module 100 are reduced, conforming to the miniaturization trend of equipment at present. At the same time, the lens barrel 1 with smaller wall thickness is convenient to be produced with high yield of qualified products and other advantages.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising:
   a lens barrel having a central axis including a first barrel wall extended at right angles to the central axis and a second barrel wall extended from the first barrel wall along the central axis;
   a lens group including at least one lens which includes a first slope;
   a stop on the first barrel wall, forming a light hole for the at least one lens; and
   a press ring abutting against the stop,
   wherein the first barrel wall of the lens barrel includes a second slope abutting against the first slope.

2. The lens module as claimed in claim 1, wherein: the lens barrel includes a lug extended from an inner surface of the first barrel wall toward the central axis of the lens barrel, and a groove is created by the lug and an inner surface of the lens barrel for at least partially receiving the stop.

3. The lens module as claimed in claim 2, wherein: the lens barrel is provided with a lug extended from the inner surface of the first barrel wall to the central axis of the lens barrel, and a groove is created by the lug and the inner surface of the lens barrel for partially receiving the stop.

4. The lens module as claimed in claim 3, wherein a glue groove for receiving the glue is provided between the press ring and the lens barrel.

5. The lens module as claimed in claim 4, wherein: a third slope is provided at an edge of the press ring, and the third slope and the inner surface of the lens barrel create the glue groove.

6. The lens module according to claim 1, wherein the press ring is made of plastic or metal.

7. The lens module as claimed in claim 1, wherein the stop is a hollow ring.

8. The lens module as claimed in claim 1, wherein an optical axis of the at least one lens, the central axis of the lens barrel and an central axis of the stop are aligned in one straight line.

9. The lens module as claimed in claim 1, wherein the at least one lens further comprises a protruding central portion and a peripheral portion around the protruding central portion, the protruding central portion extended beyond the light hole along the central axis.

10. The lens module as claimed in claim 9, wherein a gap is created between the peripheral portion and the stop.

* * * * *